No. 877,769. PATENTED JAN. 28, 1908.
C. HENKE.
PROTECTOR AGAINST SKIDDING.
APPLICATION FILED AUG. 15, 1907.
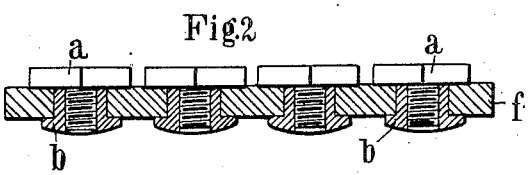
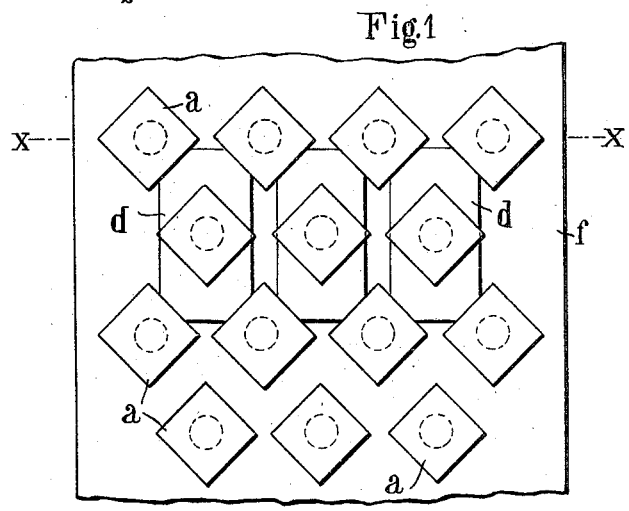
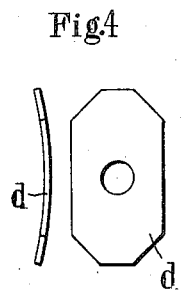
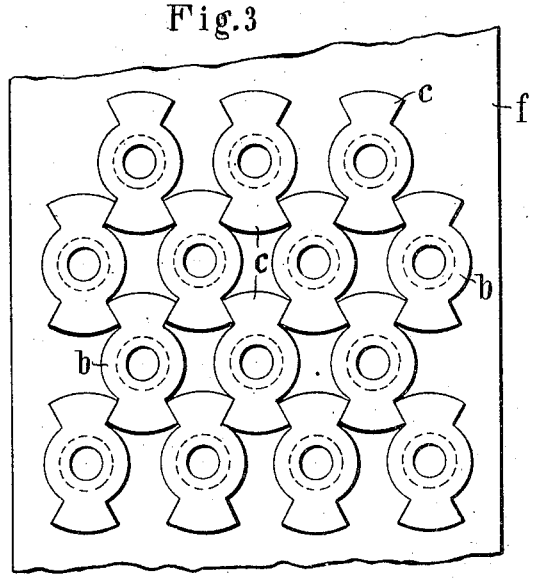

UNITED STATES PATENT OFFICE.

CARL HENKE, OF WITTEN, GERMANY.

PROTECTOR AGAINST SKIDDING.

No. 877,769.　　　Specification of Letters Patent.　　　Patented Jan. 28, 1908.

Application filed August 15, 1907. Serial No. 388,684.

*To all whom it may concern:*

Be it known that I, CARL HENKE, engineer, citizen of the Empire of Germany, and resident of Witten-on-the-Ruhr, Moltkestrasse 9, Germany, have made certain new and useful Improvements in a Protector Against Skidding for Solid and Hollow Rubber Tires of Carriages of All Kinds, of which the following is a specification.

The present invention relates to a protector against skidding for solid and hollow rubber-tires of carriages of all kinds, which consists of exchangeable screwed non-skidding heads and nuts which are so formed and fastened in the protecting cover that they mutually prevent one another from rotating. At the same time means are provided in order to avoid the non-skidding heads turning out of the appertaining nuts, and this is effected by suitably shaped pieces of metal being inserted between the non-skidding heads. These pieces of metal are preferably shaped convex so that the heads which hold them fast are prevented by the resilient pressure from worming out by themselves.

The subject matter of the invention is represented on the accompanying drawing in which:

Figure 1 is a plan from above of an unrolled tire with the non-skidding devices according to the present invention, Fig. 2 is a section on the line $x$—$x$ of Fig. 1, Fig. 3 is a plan of the unrolled tire as seen from below, Fig. 4 is a plan and elevation of the piece of metal for preventing the head worming out which is inserted between the non-skidding heads, and Fig. 5 is a detailed view of one of the nuts.

Steel nuts $b$ are inserted into the outside rubber or leather $f$ of the tire of the wheel in such a manner that their projections or shoulders $c$ which are formed dovetail-shaped reciprocally lock one another and thus prevent the nuts turning. The non-skidding heads $a$ which are provided with corresponding threads are screwed from above into the nuts which are arranged as described. The non-skidding heads $a$ are of square or other suitable shape.

In order to prevent the non-skidding heads $a$ from becoming loose or from falling out, locking pieces or plates $d$ of steel are inserted between the heads in a manner as will be seen from Fig. 1, so that each of the corners of the plates $d$ will come into engagement with an edge of one of the heads $a$ and prevent such heads from turning. Thus in the arrangement shown in Fig. 1 three of the plates $d$ serve to prevent eight of the heads $a$ from turning.

In order to prevent the non-skidding heads $a$ which hold the locking pieces of metal $d$ from becoming loose, the metal plates $d$ are formed convex so that resilient pressure acts on the heads $a$.

Having now particularly described and ascertained the nature of my said invention and in what manner the same is to be performed I declare that what I claim is:

1. In means for preventing tires skidding, the combination of a casing, a plurality of nuts having threads inserted into the latter from the underside, and a plurality of exchangeable heads screwed from the outside of said casing into the nuts, said nuts having projections or shoulders which reciprocally lock one another and prevent the nuts rotating, as set forth.

2. In means for preventing tires skidding, the combination of a casing, a plurality of nuts having female threads inserted into the latter from the underside, and a plurality of exchangeable heads screwed from the outside of said casing into the nuts, said nuts having dovetail-shaped projections or shoulders which reciprocally lock one another and prevent the nuts rotating, as set forth.

3. In means for preventing tires skidding, the combination of a casing, a plurality of nuts having female threads inserted into the latter from the underside, and a plurality of exchangeable heads screwed from the outside of said casing into the nuts, with locking-pieces arranged between said heads, said nuts having projections or shoulders which reciprocally lock one another and prevent the nuts rotating, as set forth.

4. In means for preventing tires skidding, the combination of a casing, a plurality of nuts having threads inserted into the latter from the inside, and a plurality of exchangeable heads screwed from the outside of said casing into the nuts, with locking-pieces arranged between said heads, said nuts having dovetail-shaped projections or shoulders which reciprocally lock one another and prevent the nuts rotating, as set forth.

5. In means for preventing tires skidding, the combination of a casing, a plurality of nuts having female threads inserted into the latter from the underside, and a plurality of exchangeable heads screwed from the outside of said casing into the nuts, with bent locking-pieces arranged, substantially as shown, between said heads for exerting resilient pressure against the latter and preventing the same worming out of said nuts, said nuts having projections or shoulders which reciprocally lock one another and prevent the nuts rotating, as set forth.

In testimony whereof I have hereunto set my hand in presence of two subscribing witnesses.

CARL HENKE.

Witnesses:
 WOLDEMAR HAUPT,
 HENRY HASPER.